(12) United States Patent
Kess, Jr.

(10) Patent No.: US 11,509,754 B1
(45) Date of Patent: Nov. 22, 2022

(54) MOBILE COMMUNICATION AND GAMING DEVICE

(71) Applicant: Gerald Kess, Jr., Baltimore, MD (US)

(72) Inventor: Gerald Kess, Jr., Baltimore, MD (US)

( * ) Notice: Subject to any disclaimer, the term of this patent is extended or adjusted under 35 U.S.C. 154(b) by 7 days.

(21) Appl. No.: 17/108,051

(22) Filed: Dec. 1, 2020

(51) Int. Cl.
*H04M 1/02* (2006.01)
*A63F 13/92* (2014.01)
*A63F 13/26* (2014.01)

(52) U.S. Cl.
CPC .......... *H04M 1/0256* (2013.01); *A63F 13/92* (2014.09); *H04M 1/0252* (2013.01); *H04M 1/0266* (2013.01); *A63F 13/26* (2014.09); *H04M 1/0262* (2013.01)

(58) Field of Classification Search
None
See application file for complete search history.

(56) References Cited

U.S. PATENT DOCUMENTS

| | | | |
|---|---|---|---|
| 4,969,647 A | 11/1990 | Mical | |
| D720,342 S | 12/2014 | Starrett | |
| 8,989,763 B2 * | 3/2015 | Paulson | G01S 19/258 455/457 |
| 9,118,750 B2 | 8/2015 | Vossoughi | |
| 9,138,640 B2 | 9/2015 | Baum | |
| 9,281,859 B1 | 3/2016 | Lee | |
| 10,560,558 B1 * | 2/2020 | Kosa | A63F 13/24 |
| 11,134,672 B1 * | 10/2021 | Warren | H02J 7/35 |
| 2008/0125191 A1 * | 5/2008 | Nordenskjold | G06F 1/1679 455/575.1 |
| 2008/0203972 A1 * | 8/2008 | Sather | H01M 10/46 29/623.5 |
| 2013/0341214 A1 * | 12/2013 | King | A63F 13/98 206/216 |
| 2014/0106817 A1 | 4/2014 | Lin | |
| 2014/0179437 A1 | 6/2014 | King | |
| 2014/0256443 A1 * | 9/2014 | Joynes | A63F 13/06 463/37 |
| 2015/0244408 A1 * | 8/2015 | Chen | H04B 1/3888 455/575.8 |
| 2019/0361694 A1 * | 11/2019 | Gordon | G06F 1/1626 |
| 2021/0289645 A1 * | 9/2021 | Wang | H05K 5/0226 |

FOREIGN PATENT DOCUMENTS

WO 2009089393 7/2009

* cited by examiner

*Primary Examiner* — Quoc D Tran

(57) ABSTRACT

The mobile communication and gaming device is a personal data device. The mobile communication and gaming device is a programmable logical device. The mobile communication and gaming device has an interface that is configured for use with gaming applications. The mobile communication and gaming device comprises a logical appliance and a housing. The housing contains the logical appliance.

2 Claims, 7 Drawing Sheets

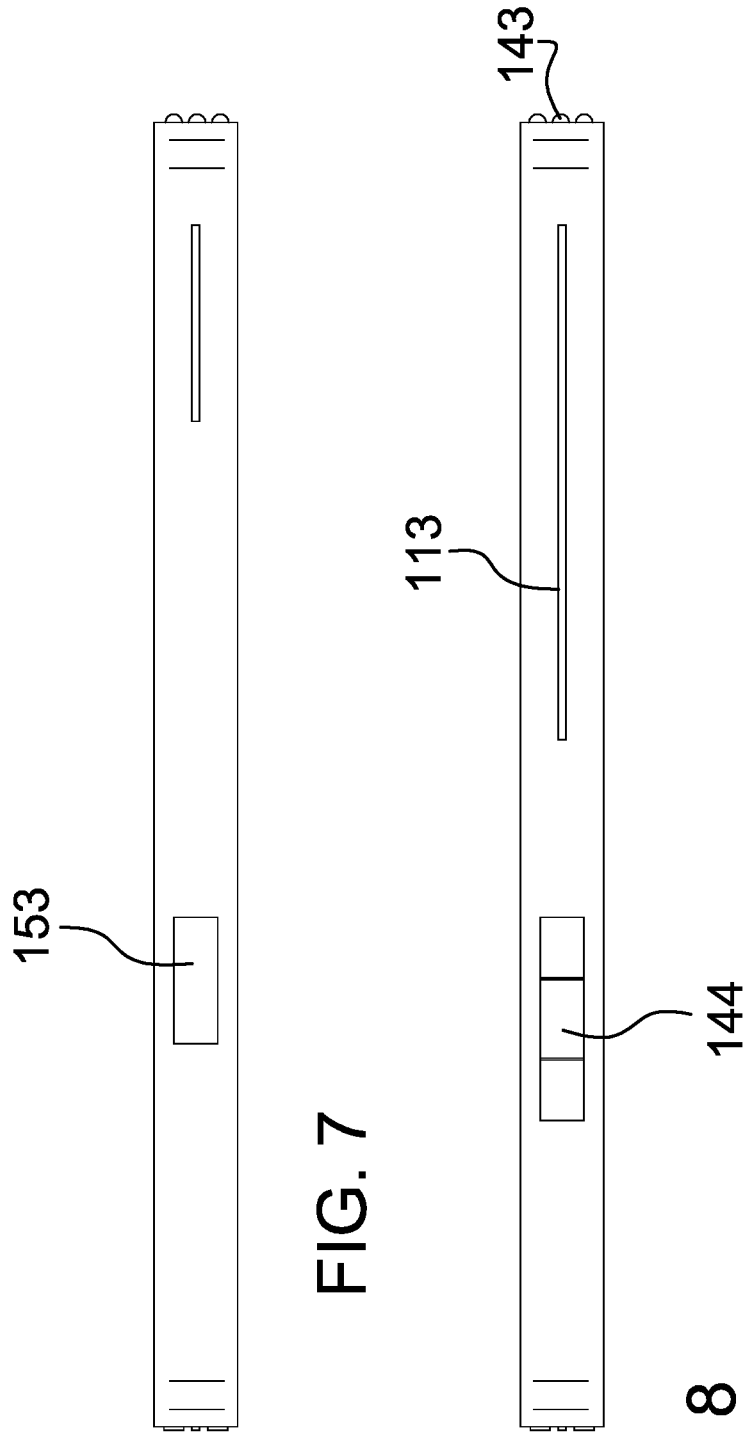

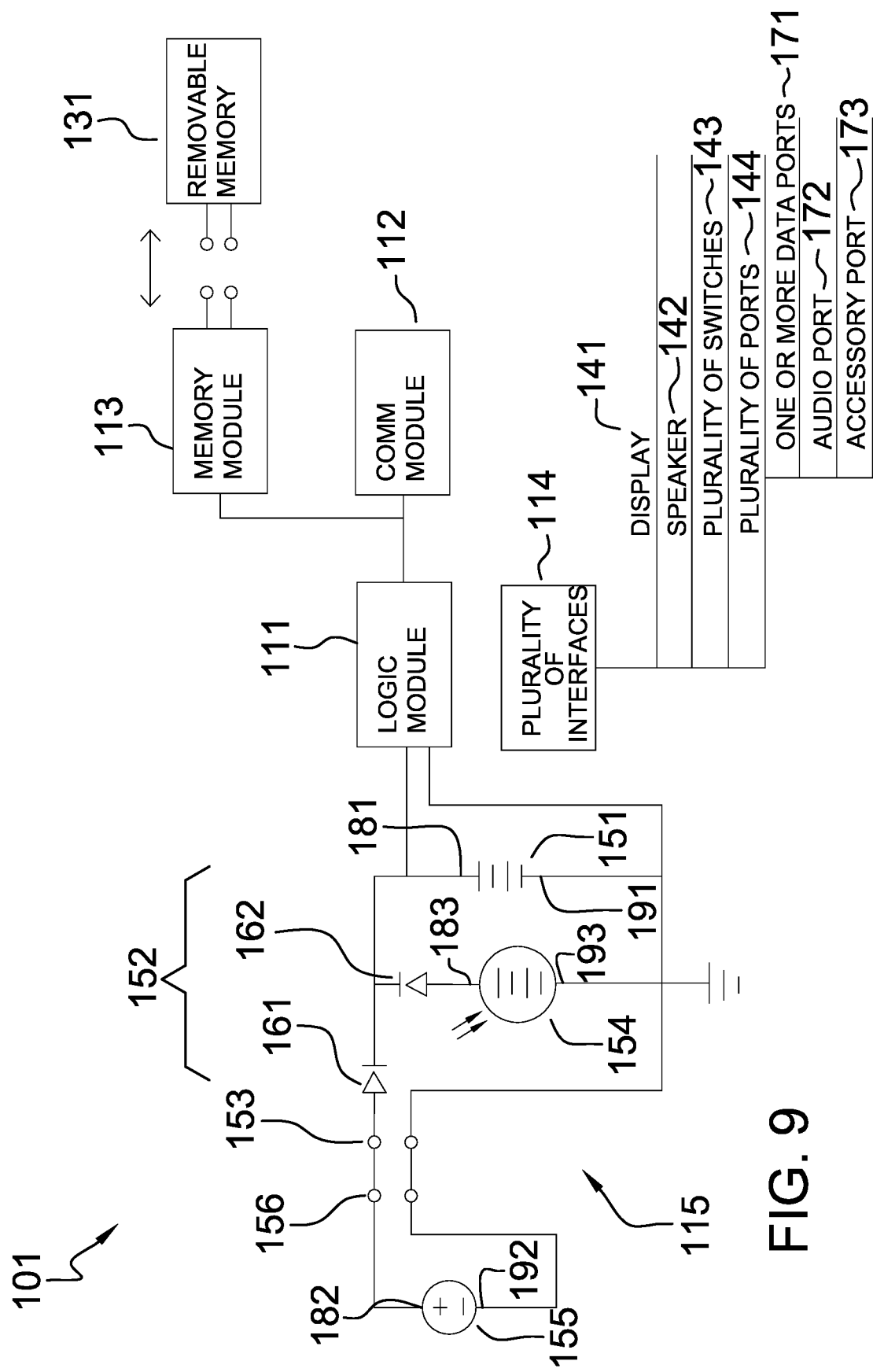

MOBILE COMMUNICATION AND GAMING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of games and amusements including video games, more specifically, an interconnection arrangement with a game server. (A63F13/30)

SUMMARY OF INVENTION

The mobile communication and gaming device is a personal data device. The mobile communication and gaming device is a programmable logical device. The mobile communication and gaming device has an interface that is configured for use with gaming applications. The mobile communication and gaming device comprises a logical appliance and a housing. The housing contains the logical appliance.

These together with additional objects, features and advantages of the mobile communication and gaming device will be readily apparent to those of ordinary skill in the art upon reading the following detailed description of the presently preferred, but nonetheless illustrative, embodiments when taken in conjunction with the accompanying drawings.

In this respect, before explaining the current embodiments of the mobile communication and gaming device in detail, it is to be understood that the mobile communication and gaming device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mobile communication and gaming device.

It is therefore important that the claims be regarded as including such equivalent construction insofar as they do not depart from the spirit and scope of the mobile communication and gaming device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 7 is a top view of an embodiment of the disclosure.

FIG. 8 is a bottom view of an embodiment of the disclosure.

FIG. 9 is a block diagram of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
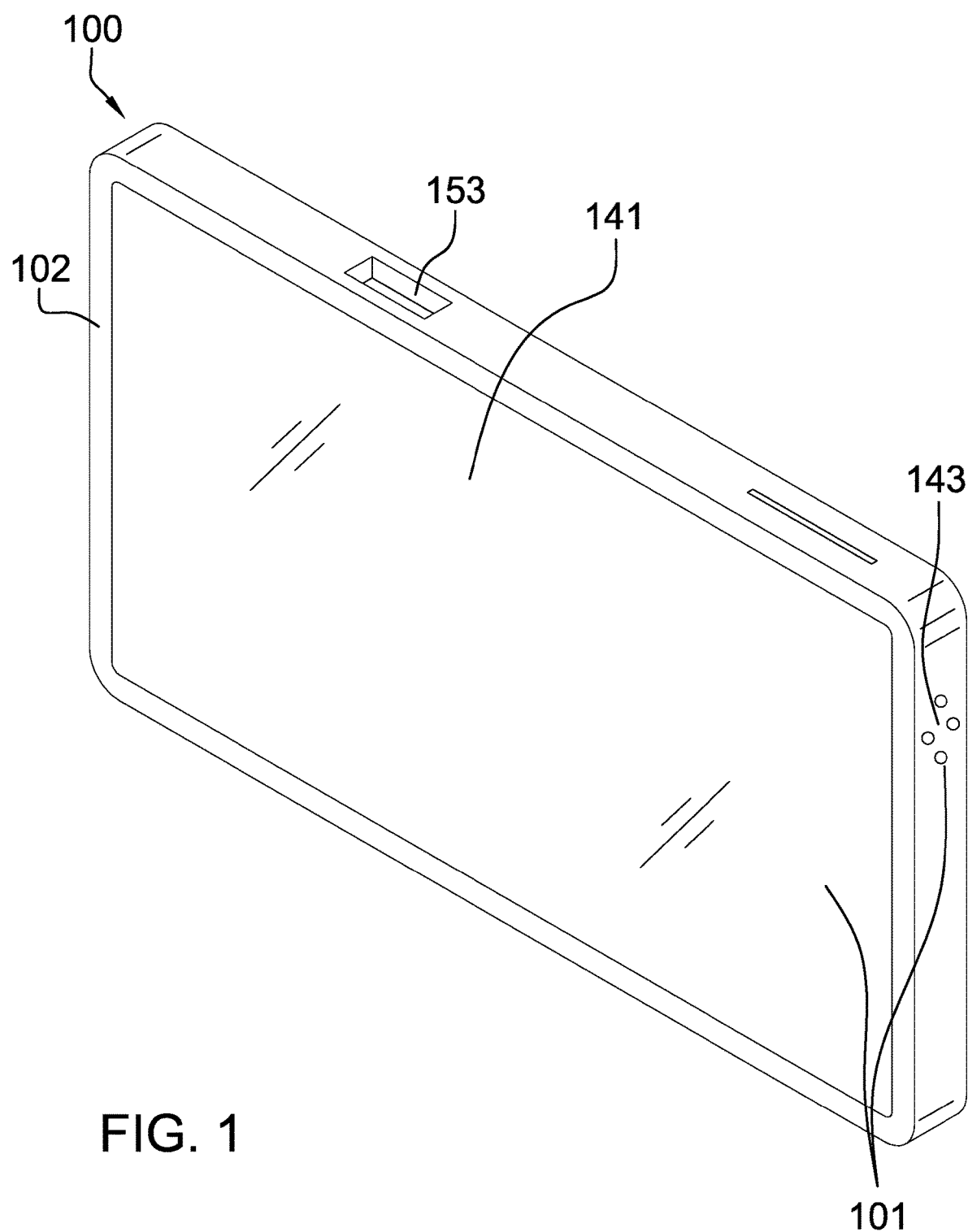
FIG. 1 is a perspective view of an embodiment of the disclosure.
Figure 2:
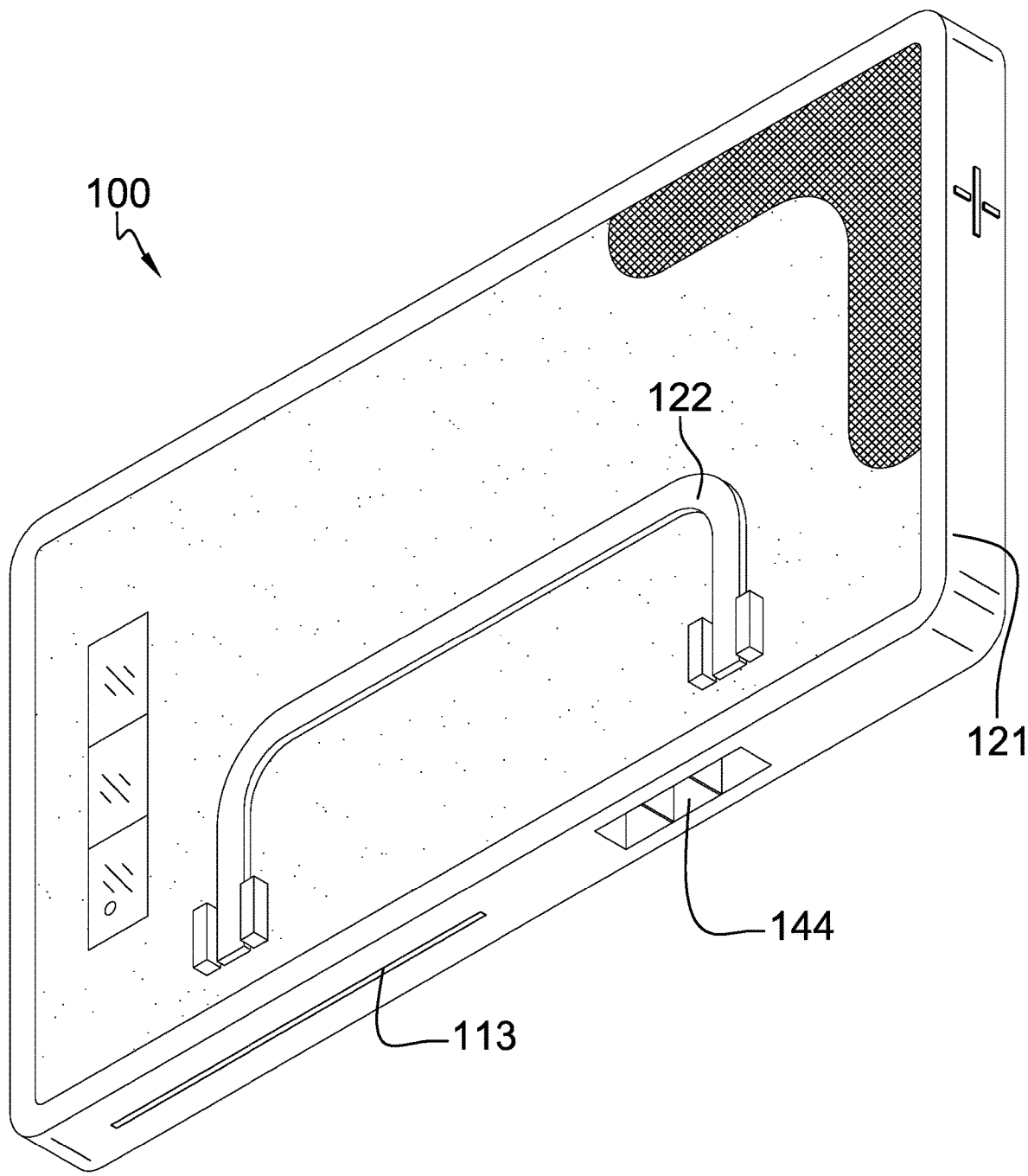
FIG. 2 is a reverse perspective view of an embodiment of the disclosure.
Figure 3:
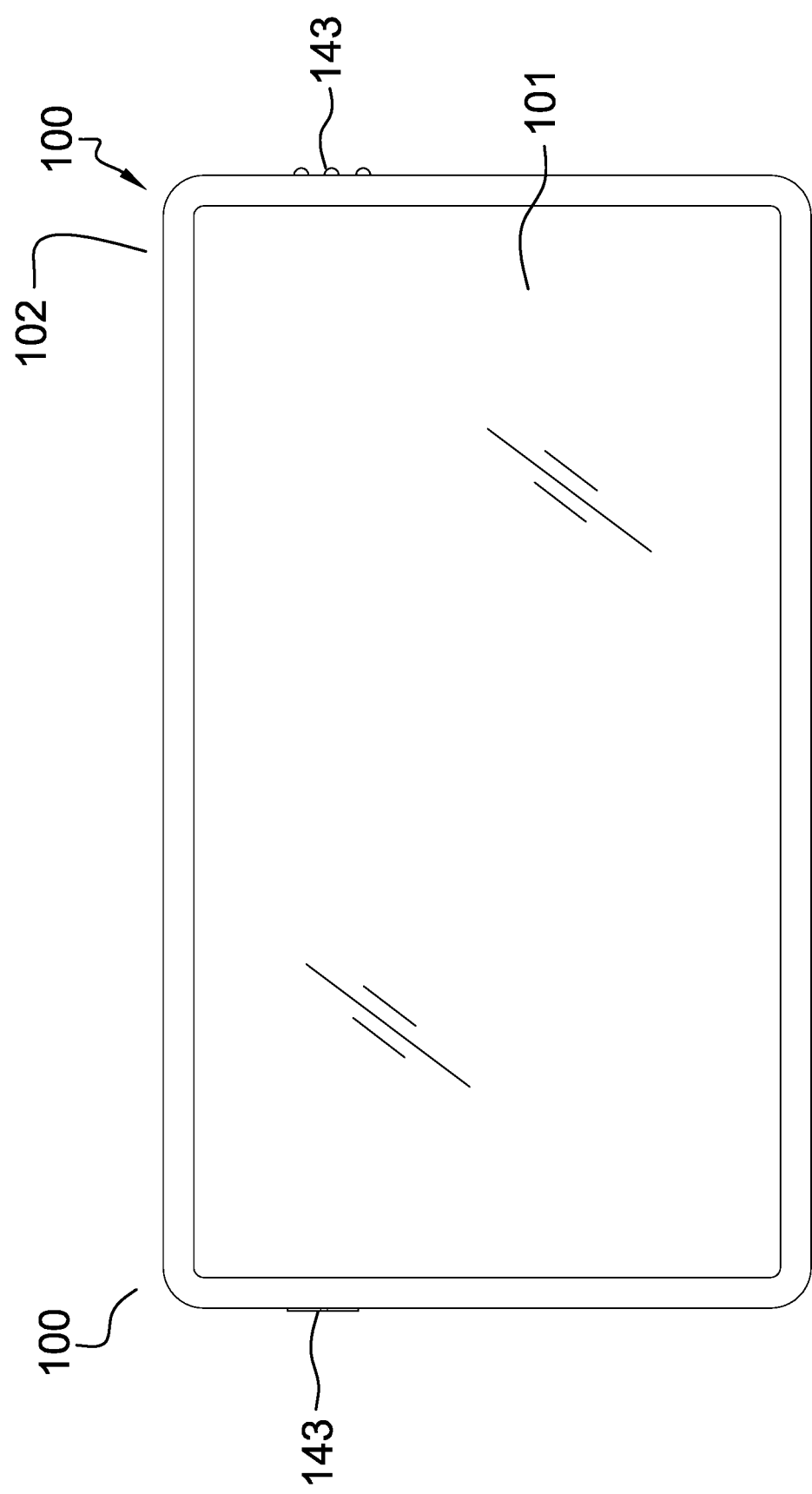
FIG. 3 is a front view of an embodiment of the disclosure.
Figure 4:
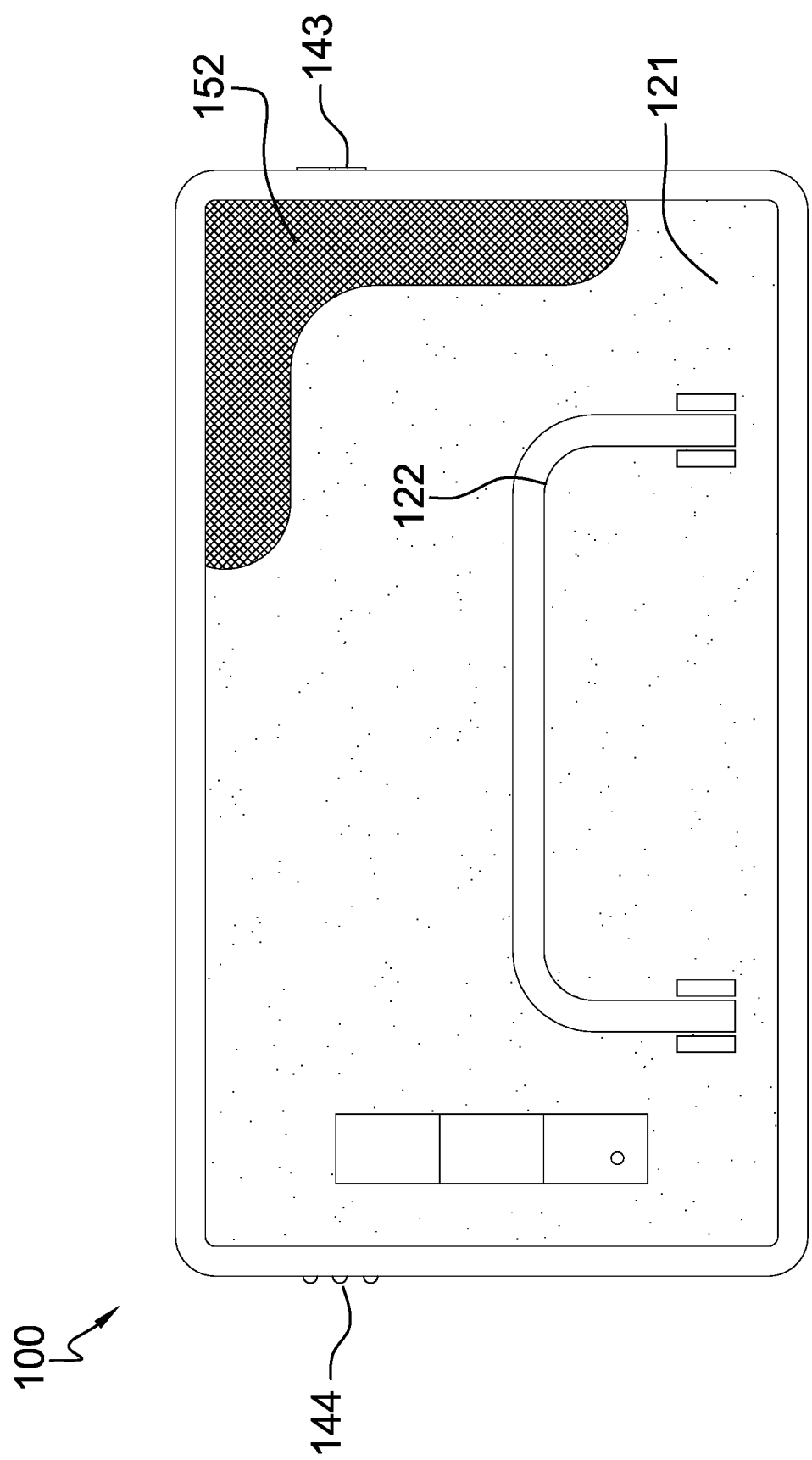
FIG. 4 is a rear view of an embodiment of the disclosure.
Figure 6B:
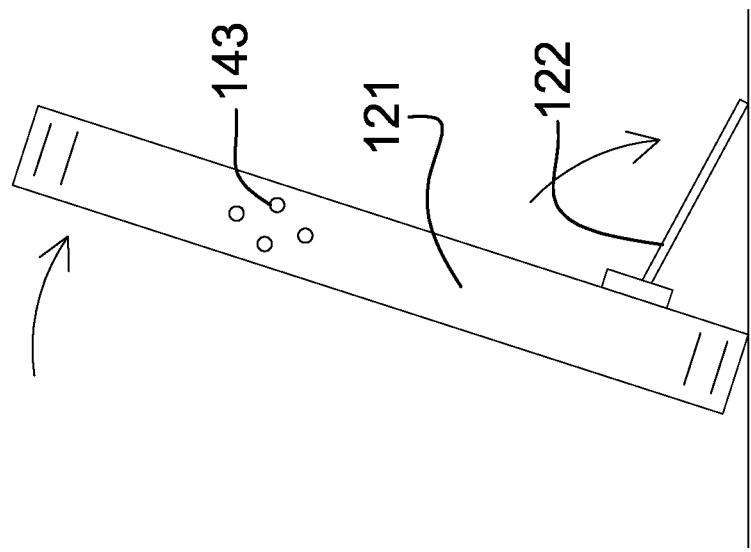
FIG. 6b is a reverse side in-use view of an embodiment of the disclosure.
Figure 6A:
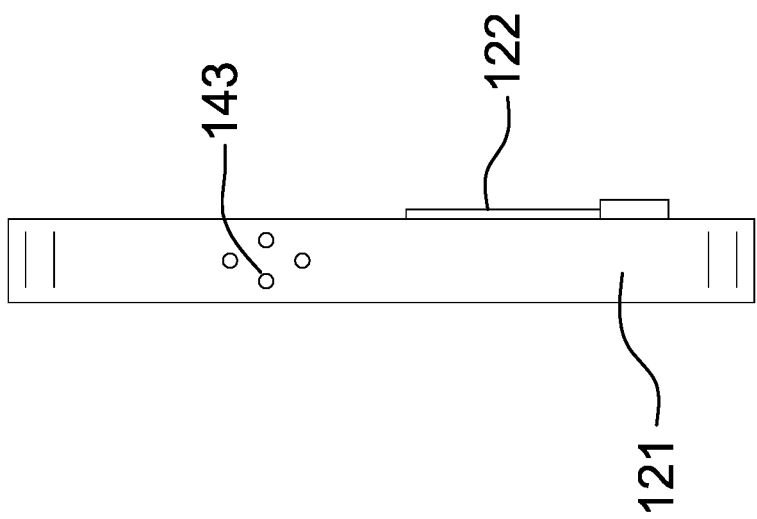
FIG. 6a is a reverse side view of an embodiment of the disclosure.
Figure 5:
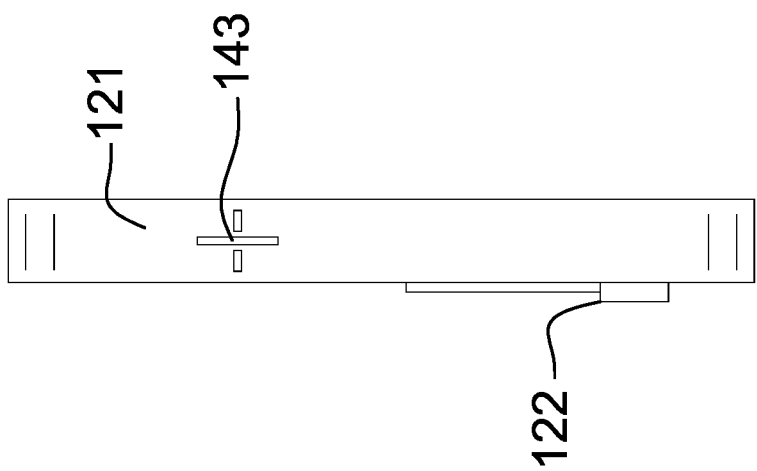
FIG. 5 is a side view of an embodiment of the disclosure.

Detailed reference will now be made to one or more potential embodiments of the disclosure, which are illustrated in FIGS. 1 through 9.

The mobile communication and gaming device 100 (hereinafter invention) is a personal data device. The invention 100 is a programmable logical device. The invention 100 has an interface that is configured for use with gaming applications. The invention 100 comprises a logical appliance 101 and a housing 102. The housing 102 contains the logical appliance 101.

The housing 102 is a rigid structure. The housing 102 contains the logical appliance 101. The housing 102 is formed with all apertures and form factors necessary to allow the housing 102 to accommodate the use, the operation, and the external connections of the logical appliance 101. Methods to form a housing 102 suitable for the purposes described in this disclosure are well-known and documented in the mechanical arts. The housing 102 comprises a shell 121 and a kickstand 122.

The shell 121 is a rigid structure. The shell 121 contains the logical appliance 101. The shell 121 is formed with all apertures and form factors necessary to allow the shell 121 to accommodate the use and operation of the logical appliance 101. Methods to form a shell 121 suitable for the purposes described in this disclosure are well-known and documented in the mechanical arts. The kickstand 121 attaches to the shell 121. The kickstand 122 is a mechanical device that vertically supports the shell 121. The kickstand 122 is defined in greater detail elsewhere in this disclosure.

The logical appliance 101 is a logical device. The logical appliance 101 is a programmable device. The logical appliance 101 is a personal data device. The logical appliance 101 is a programmable electrical device that provides data management and communication services through one or more functions referred to as an application. The application is a set of logical operating instructions that are performed by the logical appliance 101. The addition of an application will provide increased functionality for the logical appliance 101. Methods to design and implement an application on a logical appliance 101 are well known and documented in the electrical arts. The logical appliance 101 comprises a logic module 111, a communication module 112, a memory module 113, a plurality of interfaces 114, and a power system 115. The logic module 111, the communication module 112, the memory module 113, the plurality of interfaces 114, and the power system 115 are electrically interconnected.

The logic module 111 is a readily and commercially available programmable electronic device that is used to manage, regulate, and operate the logical appliance 101. Depending on the specific design and the selected components, the logic module 111 can be a separate component within the logical appliance 101 or the functions of the logic module 111 can be incorporated into another component within the logical appliance 101. The communication module 112 is a wireless electronic communication device that allows the logic module 111 to wirelessly communicate with a locally presented electronic device. Specifically, the communication module 112 establishes a wireless communication link between the logical appliance 101 and the locally presented electronic device. In the first potential embodiment of the disclosure, the communication module 112 supports a communication protocol selected from the group consisting of a WiFi™ protocol or a Bluetooth™ protocol.

The memory module 113 is an electric circuit that supports a memory device. The memory module 113 further comprises a removable memory structure 131. The memory module 113 is an interface structure that electrically connects the logical appliance 101 to the removable memory structure 131. The removable memory structure 131 is a memory device. A memory device is defined elsewhere in this disclosure. The removable memory structure 131 removably attaches to the memory module 113 such that the removable memory structure 131 electrically connects to the logic module 111.

The removable memory structure 131 removably attaches to the memory module 113 such that one or more removable memory structures 131 can be interchanged. The removable memory structure 131 removably attaches to the memory module 113 such that the removable memory structure 131 can be removed for security purposes. The logic module 111 controls the operation of both the memory module 113 and the removable memory structure 131. The logic module 111 stores data to the removable memory structure 131 through the memory module 113. The logic module 111 retrieves data from the removable memory structure 131 through the memory module 113.

The plurality of interfaces 114 comprises a collection of interface devices that allow for an exchange of visual, audio, and visual data between the logic module 111 individuals and electrical devices that are exterior to the housing 102 of the logical appliance 101. The plurality of interfaces 114 comprises a touchscreen display 141, a speaker 142, a plurality of switches 143, and a plurality of ports 144. The touchscreen display 141, the speaker 142, the plurality of switches 143, and the plurality of ports 144 electrically connect to the logic module 111.

The touchscreen display 141 is an electrical device. The touchscreen display 141 is a display. The logic module 111 controls the operation of the touchscreen display 141. The touchscreen display 141 displays visually accessible information to an individual in the form of images.

The speaker 142 is a transducer. The speaker 142 converts electrical signals provided by the logic module 111 into audible sounds. The logic module 111 controls the operation of the speaker 142. The speaker 142 announces audibly accessible information to an individual in the form of sound waves.

Each of the plurality of switches 143 is an electrical switch. The logic module 111 monitors each of the plurality of switches 143. The logic module 111 takes a previously programmed action based upon the actuation of any switch selected from the plurality of switches 143. A subset of the plurality of switches 143 is laid out on the shell 121 in a diamond (or cross) pattern characteristic of a gaming interface device. The use of one or more electrical switches as in interface to control the operation of a logic module 111 is well-known and documented in the electrical and programming arts.

Each of the plurality of ports 144 is an electrical termination. Each of the plurality of ports 144 forms an electrical connection with a locally presented electrical device such that the locally presented electrical device can interoperate with the logical appliance 101. The plurality of ports 144 further comprises one or more data ports 171, an audio port 172, and one or more accessory ports 173. Each of the plurality of ports 144 is controlled by the logic module 111.

Each of the one or more data ports 171 is an electrical termination used to transfer digital data between the logic module 111 and a locally presented electrical device. The audio port 172 is an electrical termination used to transfer an electrical signal between the logic module 111 and an externally provided transducer. The one or more accessory ports 173 is an electrical termination used to transfer an electrical signal between the logic module 111 and a locally presented electrical device.

The power system 115 is an electrochemical circuit. The power system 115 provides the electrical energy used to power the logic module 111, the communication module 112, the memory module 113, and the plurality of interfaces 114. The power system 115 comprises a battery 151, a plurality of diodes 152, a charging port 153, a photovoltaic cell 154, and an external power source 155. The external power source 155 further comprises a charging plug 156. The battery 151, the plurality of diodes 152, the charging port 153, the photovoltaic cell 154, the external power source 155 and the charging plug 156 are electrically interconnected.

The plurality of diodes 152 further comprises a first diode 161 and a second diode 162. The battery 151 is further defined with a first positive terminal 181 and a first negative terminal 191. The external power source 155 is further defined with a second positive terminal 182 and a second negative terminal 192. The photovoltaic cell 154 is further defined with a third positive terminal 183 and a third negative terminal 193.

The battery 151 is an electrochemical device. The battery 151 converts chemical potential energy into the electrical energy used to power the logical appliance 101.

The battery 151 is a commercially available rechargeable battery 151. The chemical energy stored within the rechargeable battery 151 is renewed and restored through the use of the charging port 153. The charging port 153 is an electrical circuit that reverses the polarity of the rechargeable battery 151 and provides the energy necessary to reverse the chemical processes that the rechargeable battery 151 initially used to generate the electrical energy. This reversal of the chemical process creates a chemical potential energy that will later be used by the rechargeable battery 151 to generate electricity. The charging port 153 forms an electrical connection to an external power source 155 using a charging plug 156. The charging plug 156 forms a detachable electrical connection with the charging port 153. The charging port 153 receives electrical energy from the external power source 155 through the charging plug 156. The first diode 161 is an electrical device that allows current to flow in only one direction.

The first diode 161 installs between the rechargeable battery 151 and the charging port 153 such that electricity will not flow from the first positive terminal 181 of the rechargeable battery 151 into the second positive terminal 182 of the external power source 155. The first diode 161 further installs between the photovoltaic cell 154 and the charging port 153 such that electricity will not flow from the third positive terminal 183 of the photovoltaic cell 154 into the second positive terminal 182 of the external power source 155. In the first potential embodiment of the disclosure, the external power source 155, the charging plug 156, and the charging port 153 are compatible with USB power requirements.

The chemical energy stored within the rechargeable battery 151 is renewed and restored through the use of the photovoltaic cell 154. The photovoltaic cell 154 is an electrical circuit that reverses the polarity of the rechargeable battery 151 and provides the energy necessary to reverse the chemical processes that the rechargeable battery 151 initially used to generate the electrical energy. This reversal of the chemical process creates a chemical potential energy that will later be used by the rechargeable battery 151 to generate electricity. The photovoltaic cell 154 generates electrical energy from electromagnetic radiation such as light.

The second diode 162 is an electrical device that allows current to flow in only one direction. The second diode 162 installs between the rechargeable battery 151 and the photovoltaic cell 154 such that electricity will not flow from the first positive terminal 182 of the rechargeable battery 151 into the third positive terminal 183 of the photovoltaic cell 154. The second diode 162 further installs between the second positive terminal 182 of the external power source 155 and the photovoltaic cell 154 such that electricity will not flow from the second positive terminal 182 of the external power source 155 into the third positive terminal 183 of the photovoltaic cell 154. In the first potential embodiment of the disclosure, the photovoltaic cell 154 is compatible with USB power requirements.

The following definitions were used in this disclosure:

Announce: As used in this disclosure, to announce means to generate audible sounds over a transducer.

Battery: As used in this disclosure, a battery is a chemical device consisting of one or more cells, in which chemical energy is converted into electricity and used as a source of power. Batteries are commonly defined with a positive terminal and a negative terminal.

Diode: As used in this disclosure, a diode is a two terminal semiconductor device that allows current flow in only one direction. The two terminals are called the anode and the cathode. Electric current is allowed to pass from the anode to the cathode.

Display: As used in this disclosure, a display is a surface upon which is presented an image, potentially including, but not limited to, graphic images and text, that is interpretable by an individual viewing the projected image in a meaningful manner.

External Power Source: As used in this disclosure, an external power source is a source of the energy that is externally provided to enable the operation of the present disclosure. Examples of external power sources include, but are not limited to, electrical power sources and compressed air sources.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Handheld: As used in this disclosure, when referring to an item or device, handheld means that the item or device is small and light enough: 1) to be operated while a person holds the item or device in their hands; and, 2) to be carried by hand over a distance.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Interface: As used in this disclosure, an interface is a physical or virtual boundary that separates two different systems across which information is exchanged.

Kickstand: As used in this disclosure, a kickstand is a structure that attaches to an object. The kickstand rotates from a storage position to a deployed position. In the deployed position, the kickstand holds the object in a roughly vertical orientation.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logical Appliance: As used in this disclosure, a logical appliance is an electrical device that processes externally provided inputs to generate outputs that are determined from a previously determined logical functions. A logical appliance may or may not be programmable.

Logical Device: As used in this disclosure, a logical device is a programmable electrical device that processes externally provided inputs to generate outputs that are determined from a previously programmed set of instructions.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Memory Device: As used in this device, a memory device is an electronic device that stores information (including audio and video data) in a digital format. Common memory devices include the RAM (random access memory) and disk drives in a computer, USB (Universal Serial Bus) drives, DVD (Digital Video Disk) formatted video, and SD (secure digital) cards.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Orientation: As used in this disclosure, orientation refers to the positioning of a first object relative to: 1) a second object; or, 2) a fixed position, location, or direction.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Rigid Structure: As used in this disclosure, a rigid structure is a solid structure formed from an inelastic material that resists changes in shape. A rigid structure will permanently deform as it fails under a force.

Roughly: As used in this disclosure, roughly refers to a comparison between two objects. Roughly means that the difference between one or more parameters of the two compared are not significantly different.

Shell: As used in this disclosure, a shell is a structure that forms an outer covering intended to contain an object. Shells are often, but not necessarily, rigid or semi-rigid structures that are intended to protect the object contained within it.

Speaker: As used in this disclosure, a speaker is an electrical transducer that converts an electrical signal into an audible sound.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Touchscreen Display: As used in this disclosure, a touchscreen display is an interface that allows a user to interface with a logical device by touching the image bearing surface of a display.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A personal data device comprising
a logical appliance and a housing;
wherein the housing contains the logical appliance;
wherein the personal data device is a programmable logical device;
wherein the personal data device has an interface that is configured for use with gaming applications;
wherein the logical appliance comprises a logic module, a communication module, a memory module, a plurality of interfaces, and a power system;

wherein the power system comprises a battery, a plurality of diodes, a charging port, a photovoltaic cell, and an external power source;
wherein the charging port is an electrical circuit that reverses the polarity of the rechargeable battery;
wherein the photovoltaic cell is an electrical circuit that reverses the polarity of the rechargeable battery;
wherein the charging port forms an electrical connection to an external power source using a charging plug;
wherein the charging plug forms a detachable electrical connection with the charging port;
wherein the charging port receives electrical energy from the external power source through the charging plug;
wherein the housing is a rigid structure;
wherein the housing contains the logical appliance;
wherein the housing comprises a shell and a kickstand;
wherein the kickstand attaches to the shell;
wherein the logical appliance is a logical device;
wherein the logical appliance is a programmable electrical device that provides data management and communication services;
wherein the shell is a rigid structure;
wherein the shell contains the logical appliance;
wherein the kickstand is a mechanical device that supports the shell;
wherein the logic module, the communication module, the memory module, the plurality of interfaces, and the power system are electrically interconnected;
wherein the logic module is a programmable electronic;
wherein the communication module is a wireless electronic communication device that allows the logic module to wirelessly communicate with a locally presented electronic device;
wherein the communication module establishes a wireless communication link between the logical appliance and the locally presented electronic device;
wherein the memory module is an electric circuit;
wherein the memory module supports a removable memory structure;
wherein the memory module further comprises a removable memory structure;
wherein the memory module is an interface structure that electrically connects the logical appliance to the removable memory structure;
wherein the removable memory structure is a memory device;
wherein the removable memory structure removably attaches to the memory module such that the removable memory structure electrically connects to the logic module;
wherein the removable memory structure removably attaches to the memory module such that one or more removable memory structures can be interchanged;
wherein the removable memory structure removably attaches to the memory module such that the removable memory structure can be removed for security purposes;
wherein the logic module controls the operation of both the memory module and the removable memory structure;
wherein the logic module stores data to the removable memory structure through the memory module;
wherein the logic module retrieves data from the removable memory structure through the memory module;
wherein the plurality of interfaces comprises a collection of interface devices that allow for an exchange of visual, audio, and visual data between the logic module and individuals and electrical devices that are exterior to the housing of the logical appliance;
wherein the plurality of interfaces comprises a touchscreen display, a speaker, a plurality of switches, and a plurality of ports;
wherein the touchscreen display, the speaker, the plurality of switches, and the plurality of ports electrically connect to the logic module;
wherein the touchscreen display is an electrical device;
wherein the touchscreen display is a display;
wherein the logic module controls the operation of the touchscreen display;
wherein the touchscreen display displays visually accessible information to an individual in the form of images;
wherein the speaker is a transducer;
wherein the speaker converts electrical signals provided by the logic module into audible sounds;
wherein the logic module controls the operation of the speaker;
wherein the speaker announces audibly accessible information to an individual in the form of sound waves;
wherein each of the plurality of switches is an electrical switch;
wherein the logic module monitors each of the plurality of switches;
wherein the logic module takes a previously programmed action based upon the actuation of any switch selected from the plurality of switches;
wherein each of the plurality of ports is an electrical termination;
wherein each of the plurality of ports forms an electrical connection with a locally presented electrical device such that the locally presented electrical device interoperates with the logical appliance;
wherein the logic module controls each of the plurality of ports;
wherein the plurality of ports further comprises one or more data ports, an audio port, and one or more accessory ports;
wherein each of the one or more data ports is an electrical termination used to transfer digital data between the logic module and a locally presented electrical device;
wherein the audio port is an electrical termination used to transfer an electrical signal between the logic module and an externally provided transducer;
wherein the one or more accessory ports is an electrical termination used to transfer an electrical signal between the logic module and a locally presented electrical device;
wherein the external power source further comprises a charging plug;
wherein the battery, the plurality of diodes, the charging port, the photovoltaic cell, the external power source, and the charging plug are electrically interconnected;
wherein the battery is further defined with a first positive terminal and a first negative terminal;
wherein the external power source is further defined with a second positive terminal and a second negative terminal;
wherein the photovoltaic cell is further defined with a third positive terminal and a third negative terminal;
wherein the battery is an electrochemical device;
wherein the battery converts chemical potential energy into the electrical energy;
wherein the photovoltaic cell generates electrical energy from electromagnetic radiation such as light;

wherein the battery is a rechargeable battery;

wherein the chemical energy stored within the rechargeable battery is renewed and restored through the use of the charging port.

2. The personal data device according to claim 1
wherein the plurality of diodes further comprises a first diode and a second diode;

wherein the first diode is an electrical device that allows current to flow in only one direction;

wherein the first diode installs between the rechargeable battery and the charging port such that electricity will not flow from the first positive terminal of the rechargeable battery into the second positive terminal of the external power source;

wherein the first diode further installs between the photovoltaic cell and the charging port such that electricity will not flow from the third positive terminal of the photovoltaic cell into the second positive terminal of the external power source;

wherein the second diode is an electrical device that allows current to flow in only one direction;

wherein the second diode installs between the rechargeable battery and the photovoltaic cell such that electricity will not flow from the first positive terminal of the rechargeable battery into the third positive terminal of the photovoltaic cell;

wherein the second diode further installs between the second positive terminal of the external power source and the photovoltaic cell such that electricity will not flow from the second positive terminal of the external power source into the third positive terminal of the photovoltaic cell.

* * * * *